Jan. 3, 1928.
R. J. MEYERS ET AL
COMPRESSOR
Filed Feb. 10, 1927
1,654,893
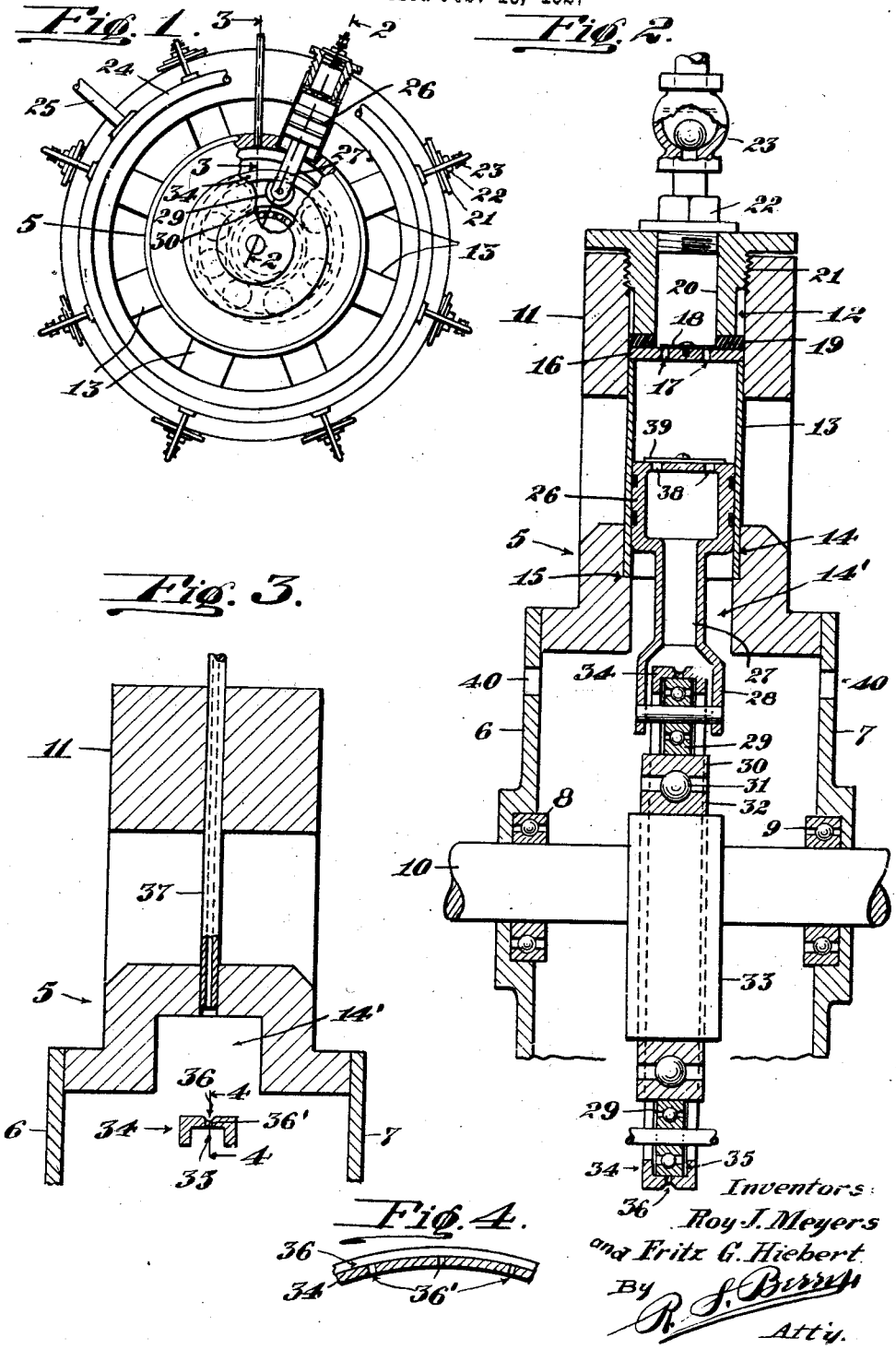
Inventors
Roy J. Meyers
and Fritz G. Hiebert
By R. S. Berry
Atty.

Patented Jan. 3, 1928.

1,654,893

UNITED STATES PATENT OFFICE.

ROY J. MEYERS AND FRITZ G. HIEBERT, OF LOS ANGELES, CALIFORNIA.

COMPRESSOR.

Application filed February 10, 1927. Serial No. 167,169.

This invention relates to a compressor and particularly pertains to improvements in the type of compressors especially adapted for use in compressing air and other gases and of the character embodying a plurality of radially disposed cylinders with reciprocal pistons therein actuated by an eccentric.

An object of the invention is to provide an improved construction in the mounting of the compressor cylinders to facilitate assemblage and removal and replacement thereof.

Another object is to provide an effective means for distributing lubricant to the internal operating parts of the compressor whereby the latter may be properly lubricated with the compressor cylinders arranged vertically.

Another object is to provide the compressor with an arrangement of anti-friction bearings so as to reduce friction and minimize wear on the operating parts.

With the foregoing objects in view with such other objects and advantages as may subsequently appear, the invention resides in the parts and in the combination, construction and arrangement of parts as hereinafter described and claimed, and illustrated in the accompanying drawings in which—

Fig. 1, is a view of the compressor as seen in side elevation with parts broken away.

Fig. 2, is a detail in vertical section as seen on the line 2—2 of Fig. 1.

Fig. 3, is a view in vertical section as seen on the line 3—3 of Fig. 1.

Fig. 4, is a detail in section taken on the line 4—4 of Fig. 3.

Referring to the drawings more specifically 5 indicates an annular housing fitted with end plates 6 and 7 carrying bearings 8 and 9 in which is revolubly mounted a drive shaft 10. Encircling the housing eccentric therewith is an annulus 11 formed with a plurality of radially extending apertures 12 through which are passed cylinders 13 to position the latter with their inner ends projecting into radially extending openings 14 in the housing 5 leading to an internal annular channel 14' in the latter; the cylinders 13 being put in place by insertion through the outer ends of the apertures 12 and openings 14 and brought to a seated position on shoulders 15 provided at the inner ends of the openings 14. When put in place the outer end of a cylinder will be spaced inwardly from the outer periphery of the annulus 11 as shown in Fig. 2, whereupon a disc 16 formed with openings 17 is seated on the outer end of the cylinder 13 which disc carries on its upper face a thin metal outwardly opening disc-valve 18 which normally closes the openings 17. Seating on the disc 16 is a packing ring 19 against which bears a sleeve 20 fitted with a threaded portion 21 screwed into the aperture 12. This sleeve 20 serves as a means for tightly holding the valve carrying disc 16 and the cylinder 13 in their seated positions. Screwed into the outer end of the sleeve 20 is a nipple 22 communicating through a check valve 23 with a manifold 24 from which leads a discharge conduit 25. Mounted in each cylinder 13 is a hollow reciprocal piston 26 formed with a tubular stem 27 fitted with a yoke 28 carrying an anti-friction roller 29 bearing upon the outer periphery of a loose ring 30 supported on ball bearings 31 seating on a ring 32 supported on an eccentric 33 carried on the drive shaft 10.

Encircling collectively the anti-friction rollers 29 and seating thereon is a floating ring 34 formed with inwardly extending side flanges to provide a guide channel 35 on its inner periphery in which rollers 29 seat. The outer periphery of the ring 34 is formed with a continuous channel 36 from which leads to inner perimeter of the ring a series of perforations 36', and leading through the annulus 11 and communicating with the channel 14' in the housing 5 is a lubricant feed pipe 37 the inner end of which opens opposite the channel 36 in the ring 34 so that lubricant delivered through the pipe 37 will be deposited in said channel and the communicating perforations and on rotation of the ring 34 be delivered to the several bearings.

Each piston 36 is formed in its outer end wall with openings 38 and which are normally closed by an outwardly opening disc-valve 39, carried by the piston.

In the operation of the invention rotation of the drive shaft 10 operates through the eccentric 33 in cooperation of the floating ring 34 to effect reciprocation of the pistons 26, which act on their outer strokes to force air previously trapped in the outer portion of the cylinders 13 through the openings 17 past the valve 18 and through the check valve 23 into the manifold 24 from whence the air thus formed under pressure may be delivered to any suitable point of discharge. The end plates 6 and 7 are formed with ports 40 through which air is delivered to the interior of the housing 5 so that on inward strokes of the piston 26 air will be caused to flow through the tubular stem 27 and be delivered through the piston into the compression spaces in the outer ends of the cylinders 13. This maintains a flow of air through the housing which tends to serve as a cooling medium.

We claim:

1. In a compressor an annular housing formed with a plurality of radial openings, an annulus encircling said housing formed with radial apertures, cylinders having their inner ends seating in the openings of the housing and their outer ends extending into the apertures of the annulus, said cylinders terminating short of the outer ends of said apertures, valve carrying discs seating on the outer ends of said cylinders, sleeves threaded into the apertures beyond the outer ends of said cylinders maintaining said discs and cylinders seated, reciprocal pistons in said cylinders, a drive shaft carried by said housing, and means actuated by said shaft for operating said pistons.

2. In a compressor, an annular housing, an annulus encircling said housing and spaced therefrom formed with a series of radial apertures, cylinders extending partly through said apertures having their inner ends seating in openings formed in the housing sleeves screwing into said apertures and bearing against the outer ends of said cylinders to hold the latter in place, a valve at the upper end of each cylinder, reciprocal pistons in said cylinders, means for reciprocating said pistons, and means whereby air may be delivered from the interior of said housing through the pistons.

3. In a compressor, a series of radial cylinders, reciprocal pistons in said cylinders, stems on said piston, anti-friction rollers on said stems, a floating ring seating on said rollers, a second ring concentric with said floating ring on which said rollers bear, an eccentric, and anti-friction rollers interposed between said eccentric and the last named ring, and means embodied in said floating ring whereby lubricant delivered to the outer periphery of the latter will be distributed to said rollers.

4. In a compressor, a series of radial cylinders, reciprocal pistons in said cylinders, stems on said pistons, anti-friction rollers on said stems, a floating ring seating on said rollers, a second ring concentric with said floating ring on which said rollers bear, an eccentric, anti-friction rollers interposed between said eccentric and the last named ring, said floating ring being formed with a continuous channel on its outer periphery and having perforations leading to the interior thereof, and means for delivering lubricant to said channel.

In testimony whereof, we have affixed our signatures.

ROY J. MEYERS.
FRITZ G. HIEBERT.